United States Patent [19]
Ojanen et al.

[11] Patent Number: 5,560,671
[45] Date of Patent: Oct. 1, 1996

[54] WINDOW MODULE FOR MOUNTING IN FLEXIBLE FABRIC OF SOFT TOPPED VEHICLES

[75] Inventors: Lassi M. Ojanen, Richmond Hill; Robert J. Passera, Bradford, both of Canada; Gari Schalte, Rochester Hills, Mich.

[73] Assignee: Decoma International Inc., Concord, Canada

[21] Appl. No.: 373,157

[22] Filed: Jan. 17, 1995

[51] Int. Cl.[6] ......................................................... B60J 7/08
[52] U.S. Cl. .................. 296/146.14; 296/201; 160/368.1
[58] Field of Search ........................ 296/146.15, 146.16, 296/146.14, 96.21, 201, 102, 145, 147; 160/90, 330, 368.1, 354; 114/361; 135/117

[56] References Cited

U.S. PATENT DOCUMENTS

| | | | |
|---|---|---|---|
| 4,398,586 | 8/1983 | Hall | 160/354 X |
| 4,799,727 | 1/1989 | Robbins et al. | 296/146.14 X |
| 4,877,283 | 10/1989 | Little et al. | 296/102 X |
| 5,040,844 | 8/1991 | Stolz et al. | 160/368.1 X |
| 5,061,332 | 10/1991 | Stolz et al. | 296/146.14 X |
| 5,325,807 | 7/1994 | Hidekura | 296/145 X |
| 5,345,717 | 9/1994 | Mori et al. | 296/146.16 X |

FOREIGN PATENT DOCUMENTS

| | | | |
|---|---|---|---|
| 284931 | 10/1988 | European Pat. Off. | 296/146.14 |
| 3841035 | 6/1990 | Germany | 296/146.14 |
| 2138874 | 10/1984 | United Kingdom | 296/146.14 |

*Primary Examiner*—Joseph D. Pape
*Attorney, Agent, or Firm*—Jane Parsons

[57] ABSTRACT

A rigid sliding window is provided for the soft tops of soft topped vehicles such as soft topped cars and boats or even tent trailers. It may be attached directly into the soft top side curtain or into a rigid side frame or inner structural frame. The window module comprises a fixed window panel, a sliding window panel and a slim line frame for the panels. The fixed window panel and an outer flange of the frame are fixed directly to the soft fabric of the soft top, the outer flange of the frame being sandwiched between an outer margin of the fixed panel and the fabric of the soft top. The frame also provides a channel in which the sliding panel runs. In the region of the sliding panel in its closed position the outer flange of the frame is fastened directly to the fabric of the soft top.

7 Claims, 3 Drawing Sheets

WINDOW MODULE FOR MOUNTING IN FLEXIBLE FABRIC OF SOFT TOPPED VEHICLES

BACKGROUND OF THE INVENTION

1. Field of the Invention

This invention relates to a rigid window module attached directly into flexible fabric of a structure such as a soft top of an automobile or of a boat, or tent trailer.

2. Acknowledgement of Prior Art

Tents, tent trailers, and the soft tops of convertible vehicles such as automobiles and boats have traditionally been provided with soft transparent windows which fold with the fabric of the basic structure. Usually these windows either do not open or may be provided with zippers. Frequently, they are formed of polyvinyl chloride (PVC).

For soft topped cars, windows may be provided which roll up and down into a structural door in a similar manner to windows provided in hard topped cars. For these cars the soft top extends over the top of the window. In this case the soft top itself may be provided with part of the rigid frame for the window which must be fitted to the window and accurately positioned in use. This rigid shaped frame portions may cause difficulty in folding away the soft top and in fitting to the window in unfolding.

The soft zippered window is not always convenient to operate especially when only momentary opening of the window is required such as, for example, when accepting dispensing of a parking ticket from an automatic dispensing machine or, at automatic take-out stations of restaurants etc. Moreover, even high quality zippers tend to corrode or stick over long usage. When windows are provided in rigid conventional type doors, considerable heavy body structure of the car may be necessary for support of the door and to provide a frame to carry the soft top above the window. This heavy structure is not always desirable in light sports type automobiles where styling, stream lining and lightness all suggest that the soft top should extend only over the cockpit.

Many problems exist with flexible windows; some of which pose a safety concern. Weatherability of the PVC film is the biggest factor affecting the windows. Age yellowing of the film is a common occurrence that can lead to diminished luminous transmittance and increased visual distortion. Additionally, during cold weather months, frost and snow are difficult to remove due to the flexibility of the vinyl windows. Cold temperatures also make them more brittle thus increasing susceptibility to scratching and/or tearing by ice scrappers or brushes. Also, the flexible material can easily distort resulting in impaired visibility.

Zippers provide a means for opening and closing these flexible windows, but these prove to be both inconvenient and impractical. Zippers do stick due to wear and under certain conditions such as the incursion of foreign bodies (e.g. dirt) or freeze in cold weather. Also, trying to open these while the vehicle is in motion could interfere with its safe operation.

The present inventors have attempted to devise a rigid openable window to be fixed directly into the flexible material, e.g. canvas, of the soft top of a convertible automobile. The problems they faced were the provision of a frame which was not so bulky that it causes problems when folding the soft top into its folded away position. At least, folding away the soft top provided with such window should cause problems which are no worse than those encountered when the soft top includes part of the window frame which must cover windows which roll down into the door.

This current invention aims to provide, a window in a soft top of vehicle, in which there is little deterioration of light transmission with time.

SUMMARY OF THE INVENTION

The current invention also aims to provide a sliding window fixed in the soft top of a vehicle which is easy to fold away when the soft top is in its folded down position and which is easy to open and provides no difficulties in setting up when the soft top is returned to its "up position". The current invention also aims to provide a rigid window for a soft top of a vehicle which is of slim structure so that it does not project inwardly or outwardly from the fabric side curtain to provide unattractive and possibly dangerous obstructions.

Accordingly, the invention provides a window module for mounting in a window aperture in a soft fabric side curtain of a soft topped vehicle, comprising: a sliding window panel of rigid, transparent plastics material; a fixed window panel of rigid transparent plastics to fit the window aperture having a panel portion and an aperture portion to be covered by the sliding window panel, the aperture portion being bounded by a peripheral margin of the window panel and by the panel portion, the peripheral margin extending outwardly of the sliding window panel, the peripheral margin being attachable to soft fabric top of said soft topped vehicle; the sliding window panel lying parallel with said fixed window panel and being slidable between an open position and a closed position; a frame for the sliding window panel, the frame being coextensive with the peripheral margin of the fixed window panel, the frame comprising: a web parallel to an outer edge of the sliding window panel and located to confine said outer edge within the frame; an inner marginal flange extending from one end of the web to lie parallel to a margin of the sliding window panel and located to confine said margin of the sliding window panel within the frame; an outer marginal flange extending from the other end of the web in fixed relation with said peripheral margin of the fixed panel to be attachable to said fabric between said fabric and said margin of the fixed window panel.

The inner marginal flange and web form together a shoulder that protrudes into either the interior space of the vehicle or, preferably, exteriorly outside the vehicle.

When a sliding window panel is not present the invention may provide a window module for mounting in a window aperture in a soft,fabric top of a soft topped vehicle, comprising: a fixed window panel of rigid, transparent plastics material having an outer margin attachable to soft fabric to of said soft topped vehicle; a frame about the window panel comprising: an outer marginal flange in fixed relation with said outer margin of said fixed window panel to be attachable to said fabric between said fabric and said outer margin; a web and inner marginal flange forming a protruding shoulder.

Whether or not a sliding panel is present, the shoulder formed by the inner marginal flange and the web of the frame may form a useful housing for folded over fabric at the edges of the window aperture. Conveniently the width of the shoulder, i.e. the projection of the web into the vehicle interior, is such that folded over fabric fits neatly into the niche formed thereby and an apparently smooth line from window panel to fabric may be substantially achieved.

The peripheral margin of the fixed window panel with the inner marginal flange of the frame confine the sliding panel in appropriate location with respect to the fixed panel and the frame.

Conveniently the frame is configured so that the web and inner marginal flange projects towards the exterior of the vehicle. Thus, the sliding window panel slides exteriorly of the fixed panel. When this is the case it is possible to provide small drain holes in the web of the frame in the region where the channel is provided. Any rainwater or condensation flowing into the channel will drain to the exterior of the vehicle through the drain holes.

The material chosen for the window panels may be a hard automotive approved polycarbonate such as Lexan or Tuffak. Lexan is a Trademark of General Electric Company and Tuffak is a Trademark of Atohaas. The sliding window may be easily opened and closed by sliding, especially if a spacer bar is present between the fixed panel and the sliding panel to prevent contact of adjacent faces. This window is not subject to the age yellowing which is a problem of existing soft PVC window within a predictable period of service (say 4000 hours of accelerated weathering and two years of actual outdoor weathering).

A protective hard coating, such as Marguard(Trademark) or CM2(Trademark), on both sides of window provides protection against scratching, chemicals and the elements. The actual material of the protective coating may be a polysiloxane.

Typically, sliding vehicle windows for installation in rigid environments are inherently thick (25–50 mm) due to the sliding track design; e.g. those found on buses or trains. Windows according to the invention may be provided in very slim form, suitable for use in soft films, such as fabrics used for soft tops of cars such as canvas, coated nylon or polyurethane.

This window module of the invention consists of three primary components; these being the window frame/track, fixed window panel, and sliding window panel. Secondary components include polyester flock for sealing between moving parts; a finger handle and/or locking mechanism for the sliding window panel; and urethane adhesive, rivets and/or neoprene double sided tape for attaching the frame and the margin of the fixed window panel to the fabric and an extruded aluminium division bar that is located on the sliding window at its interface with the fixed panel. It may be attached directly into the soft top side curtain or into a rigid side frame or inner structural frame.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
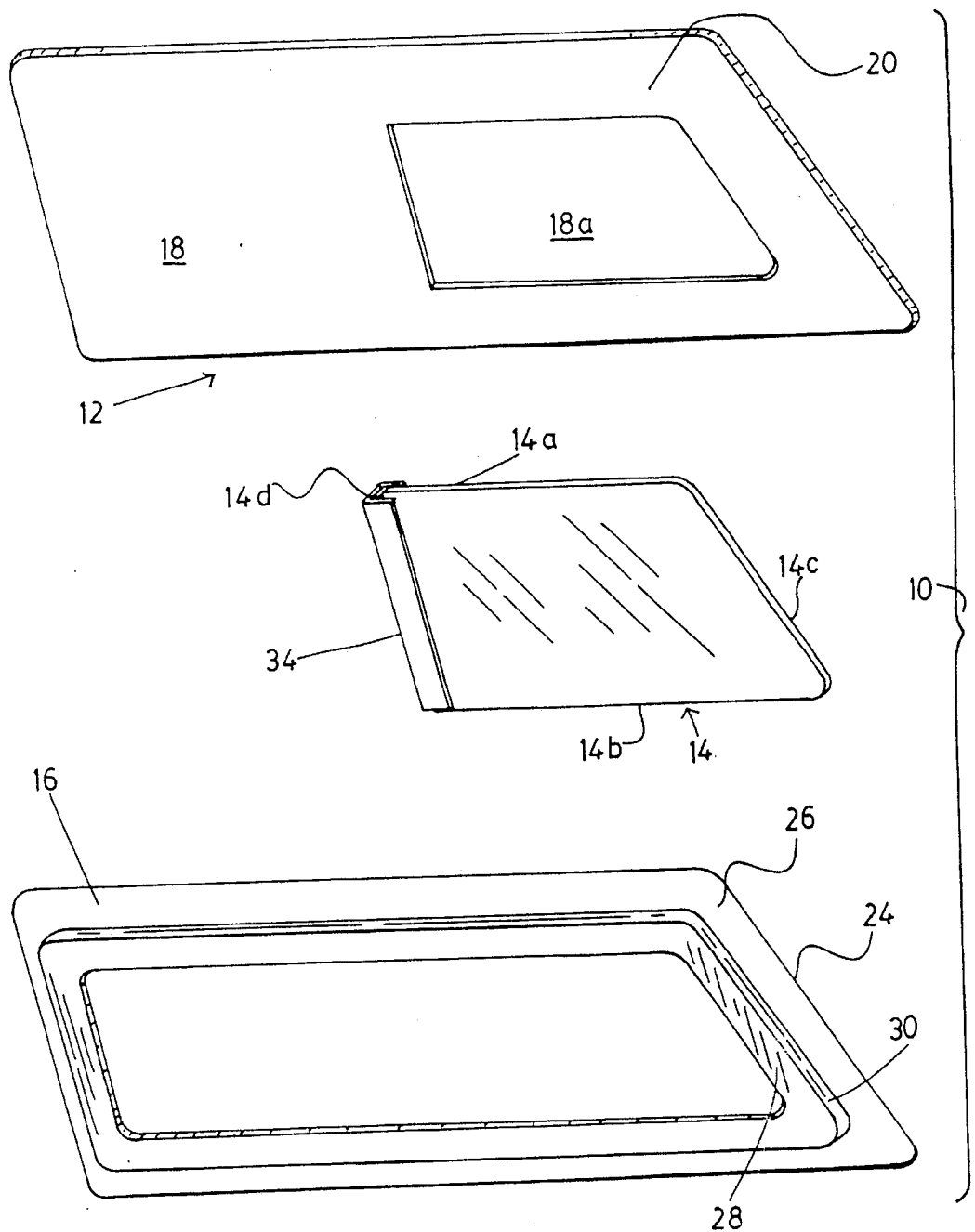
FIG. 1 is an exploded view of a window module according to the present invention with the sliding panels in closed position.
Figure 2:
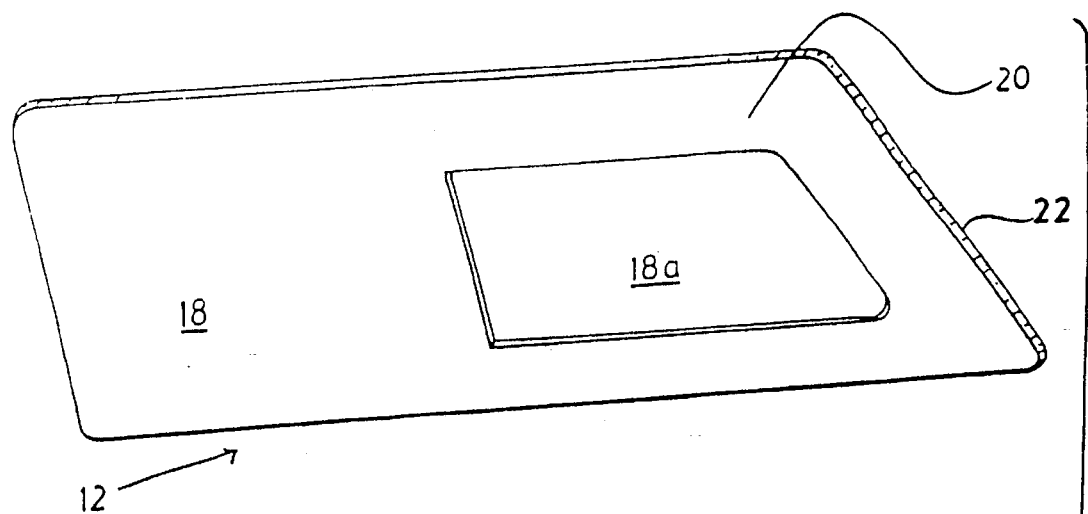
FIG. 2 shows the sliding panels arranged in the frame.
Figure 2:
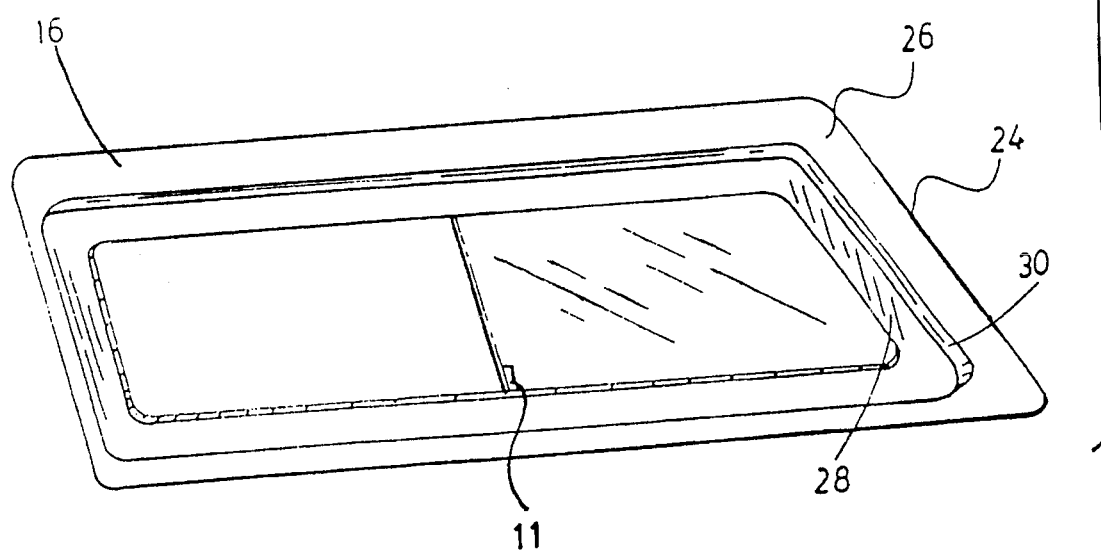
Figure 3:
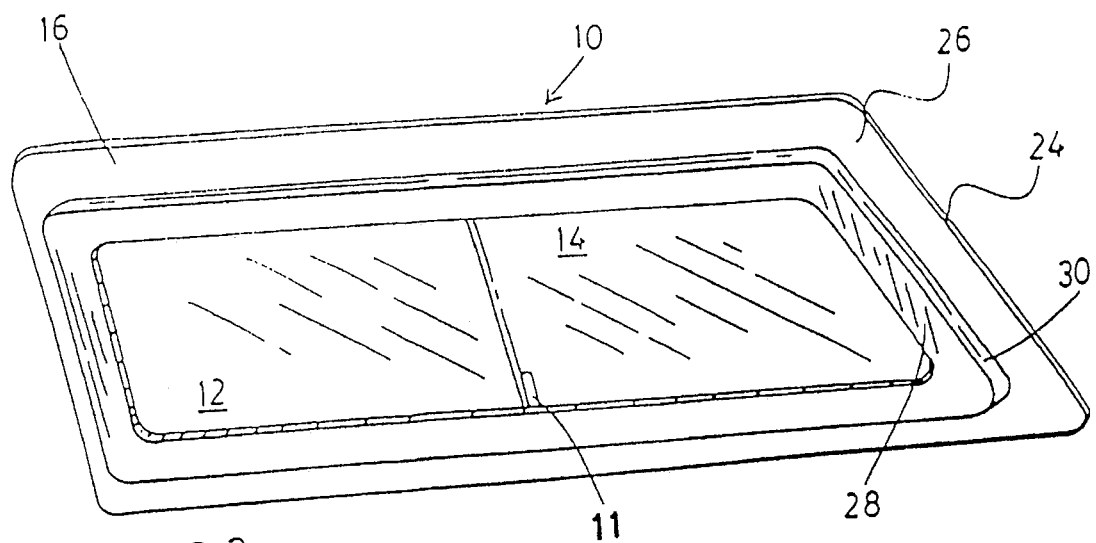
FIG. 3 shows the wholly assembled window module.

The drawings show a sliding window module 10 comprising a fixed window panel 12 and a sliding window panel 14 and a frame 16. The panels 12,14 are located in frame 16 in tile fabric 21 of the side curtain of the soft top 21 of a vehicle. It is totally immaterial what type of vehicle is used be it an automobile, a boat, or even a tent trailer or other vehicles.

There is virtually no restriction in the size, shape, colour of the window panels 12, 14 set in frame 16 except that the folding top of an automobile or boat must be able to be folded away when desired. It is of course necessary that the transparency, colour, shape and size comply with any regulations concerning visibility in driven vehicles. It is not necessary that the window be a sliding window. It is perfectly possible that sliding panel 14 is not present.

Subject to the above provisos the invention will be described with reference to the sliding window illustrated in the drawings.

The two window panels, 12, 14 may be cut from extruded polycarbonate sheets which may, if desired, have been coated on both sides with a durable clear coating of polysiloxane.

The polycarbonate material meets or exceeds the requirements of AS4 of the Federal Motor Vehicle Safety Standard #205 for rigid plastic glazing. The clear coating increases the abrasion resistance of the sheet to exposures such as washing operations, airborne particles and human contact. It also improves the weatherability and chemical resistance of the windows.

The fixed window panel 12 comprises a panel portion 18 and a marginal portion 20. The marginal portion 20 has a periphery 22 which is coextensive with the periphery 24 of frame 16.

The frame 16 comprises an outwardly extending peripheral flange 26 and an inwardly directed inner flange 28. Flanges 26 and 28 are joined by web 30 which is at a right angle to both of them. Thus, flanges 26 and 28 extend in opposed directions from the plane of web 30. In the window module 10 flange 26 lies flat against fixed window panel 12 so that periphery 24 of flange 26 and periphery 22 of window panel 12 match. Flange 28, web 30 and an inner portion 20a of the marginal portion 20 of fixed panel 12 form a U-shaped channel as may be best seen in FIG. 4. The sliding window panel 14 is located in this channel 32 and slides in it.

This window panel 12 includes an aperture 18a to be covered by the sliding panel 14 which is configured to have upper and lower edges 14a and 14b which slide in the tracks formed by U-shaped channels 32. In the closed position of the sliding window panel 14, its leading edge 14c is also housed in U-shaped channel 32. Trailing edge 14d of window panel 14 overlaps the panel portion 18 of fixed panel 12. Sealing may be provided between the panel portion 18 of fixed panel 12 and the trailing edge 14d of the sliding panel 14. This is achieved by the addition of an extruded aluminum strip 34 along the trailing edge 14d. The extruded aluminum strip 34 contains any suitable sealing means to seal against panel portion 18 such as Fin-Seal weatherstrip (Fin-Seal is a trademark of Schlegal plc. Other edges 14a, 14b and 14c of sliding panel 14 are housed in the U-channel 32. Ingress of drafts or rain along these edges is less of a risk since the edges; are protected on the one side by inner marginal portion 20a of fixed panel and on the other side by flange 28 of frame 16.

Frame 16 extends around both the fixed panel 12 and the sliding panel 14 of a fixed cross-section. It may be made from any convenient material such as a plastics molding or an aluminum molding or a molding of any other suitable material. It is, however, considered preferable to form frame 16 from a material with a coefficient of expansion similar to that of the material of the fixed panel 12 and the sliding panel 14. Suitably, fixed panel 12 and sliding panel 14 are formed from transparent polycarbonate material and frame 16 is also formed from polycarbonate material.

Fabric 21, which is cut to form an aperture for the insertion of the window module 10, may be folded over so that any raw edges are not apparent or it may be provided with a casing 36 as shown. Either the casing 36 or any folded over part or both will provide extra bulk to fabric 21 in the immediate region of the window module. This extra bulk may conveniently be located in the niche or overhang below the shoulder formed by web 30. Because the window panels 12, 14 are formed from plastics materials such as polycarbonate, they may be of minimal thickness and therefore it may be possible to adjust the width of web 30 so that the bulk of casing 36 and fabric 21 fit neatly below the shoulder.

This channel 32 may be lined with a flock channel liner 42 for easy sliding of sliding panel 14. The flock channel liner 42 may be, for example, 80 black PET flock tape by Dorrie International.

Suitably, web 30 is wide enough to allow for the presence of a spacer bar 31 which may be made of molded polycarbonate, between fixed window panel 12 and sliding window panel 14. This smooth sliding of panel 14 may be possible without the surfaces of the panels tending to jam against each other.

The web 30 of frame 16 may extend towards either the interior or exterior of the car or other vehicle. As illustrated, and preferably, the web 30 extends toward the exterior of the car and it is exterior fabric 21 of the side curtain of the soft top which is folded over or cased by casing 36 under the shoulder formed by web 30. When this is the case, it is convenient to provide interior lining for the soft top at least to cover the joint between fixed window panel 12 and fabric 21.

One reason for the preference that the web 30 should project towards the exterior of the vehicle is that water, either from rain or from condensation may accumulate in the channel 32 (see FIG. 4) between fixed panel 12 and flange 28. If the web 30 projects towards the exterior of the vehicle, drain holes 38 may be provided for the egress of water from such channel. The drain holes 38 may exit directly to the exterior of the vehicle.

Figure 4:
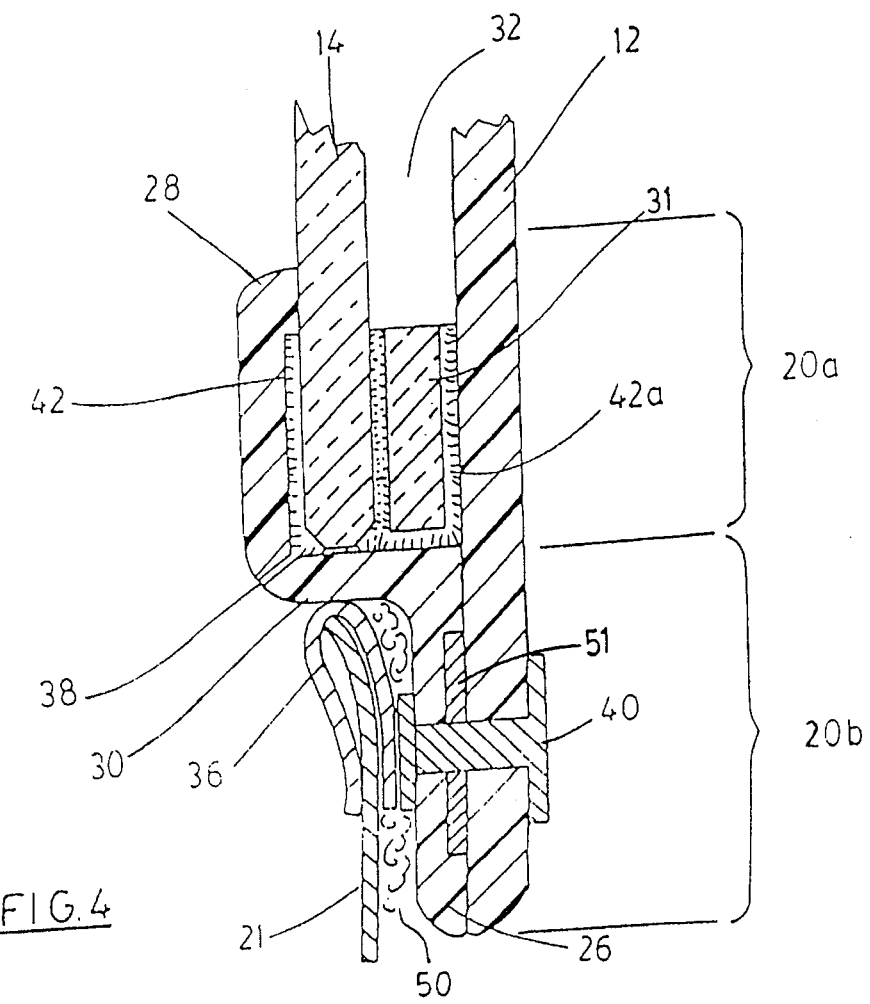
FIG. 4 is a vertical section through a window module of FIG. 3.

Peripheral outer flange 26 of frame 12 is sandwiched between margin 20 of panel 12 and fabric 21. It may be fixed to both the peripherally outer margin 20a and fabric 21 by means of adhesive, dielectric bonding, rivets, double-sided adhesive tape and the like as illustrated in FIG. 4 in which both rivets 40 and adhesive 50 are used.

Although it is clear that the height of inner flange 28 of frame 16 and the width or margin 20 of fixed panel 12 will vary with the sizes of windows under consideration, a suitable height of this flange 28 may be in the region of 10 mm. Margin 20, in the region of aperture 18a must be wider than the height of flange 28 to provide an inner portion 20a forming the second wall of U channel 32.

Margin 20 may be as wide as the combined height of flanges 26 and 28 but is not necessarily so high. As may be seen from FIG. 4 margin 20 comprises an outer portion 20b which has the same dimension as flange 26 and an inner portion 20a which has a slightly lesser dimension than that of flange 28. It is only necessary that portion 20a be sufficient to hold the spacer bars 31 in place. Of course, in the region of panel portion 18 margin 20 merges into panel portion 18.

While it is clear that dimensions will vary in dependence on the size of the window and the stresses in the soft top of the automobile or boat, it may be envisaged that the width of web 30 is such that the overall width of the module is in the range of 10–12 mm. Such a module may provide a shoulder having sufficient overhang for tucking away surplus fabric 21 and the module may be sufficiently slim for aesthetic and safe use.

Sealing of the periphery of the sliding panel 14 is achieved by the flock material 42 (flock tape with pressure sensitive adhesive) applied to the frame 12 in the L-channel between inner flange 28 and web 30.

In assembly of the window, the frame 16 is first fitted with flock 42. The sliding panel 14 is then inserted into its L-channel. As the fixed panel 12 also acts as one side of the track, flock tape 42a must also be applied to the inner margin 20a of panel 12 which acts as the opposite side of the track. For this purpose flock tape may be used. Neoprene double sided tape 51, e.g. 3M#4265, may be used to bond the fixed panel 12 to the outer flange 26 is also applied at this time.

The fixed panel 12 is then placed and fixed onto the frame 16 thus completing the assembly of the sliding window module.

A finger handle/locking mechanism 11 is located in the lower front corner of the sliding window and is functional from both inside and outside the vehicle. The front edge of the sliding window is crowned to provide a smooth, safe edge.

The module is then inserted into the top and a seal is formed between the fabric and the flange portion via a Urethane sealant (Essex urethane #575.02). To ensure the module is positively locked within the fabric, several rivets 40 are placed around the periphery of the module, tying together the fabric (on both sides of the flange) and the flange. An alternative method of bonding the fabric and polycarbonate flange is via dielectric bonding.

I claim:

1. A window module for mounting in a window aperture in a soft fabric top of a soft topped vehicle, comprising:

a sliding window panel of rigid, transparent plastic material;

a fixed window panel of rigid transparent plastic material to fit the window aperture having a panel portion and a second portion comprising an aperture, the second portion to be covered by the sliding window panel, the aperture being bounded by a peripheral margin of the fixed window panel and by the panel portion, the peripheral margin extending outwardly of the sliding window panel the peripheral margin being attachable to a soft fabric top of said soft topped vehicle;

the sliding window panel lying parallel with said fixed window panel and being slidable between an open position and a closed position;

a frame for the sliding window panel, the frame being coextensive with the peripheral margin of the fixed window panel, the frame comprising:

a web parallel to an outer edge of the sliding window panel and located to confine said edge within the frame;

an inner marginal flange extending from one end of the web to lie parallel to a margin of the sliding window panel and located to confine said margin of the sliding window panel within the frame;

an outer marginal flange extending from the other end of the web coextensive and flush with said peripheral margin of the fixed window panel to be attachable to said fabric between said fabric and said margin of the fixed window panel.

2. A window module as claimed in claim 1 in which the inner marginal flange and web form a shoulder protruding exteriorly of the vehicle.

3. A window module as claimed in claim 2 in which the web and inner marginal flange project toward the exterior of the vehicle to form a shoulder.

4. A window module as claimed in claim 3 in which water drain holes are provided in the web to drain water to the exterior of the vehicle.

5. A window module as claimed in claim 1 in which the sliding panel and the fixed panel and the frame are formed from polycarbonate plastic material.

6. A window module as claimed in claim 5 in which the sliding panel and the fixed panel are coated with a protective transparent coating.

7. In a soft top of a soft topped vehicle, a window module for mounting in a window aperture in a soft fabric top of said soft topped vehicle, comprising:

- a sliding window panel of rigid, transparent plastic material;
- a fixed window panel of rigid transparent plastic material to fit the window aperture having a panel portion and second portion comprising an aperture to be covered by the sliding window panel, the aperture being bounded by a peripheral margin of the fixed window panel and by the panel portion, the peripheral margin extending outwardly of the sliding window panel the peripheral margin being attachable to said soft fabric top of a soft topped vehicle;
- the sliding window panel lying parallel with said fixed window panel and being slidable between an open position and a closed position;
- a frame for the sliding window panel, the frame being coextensive with the peripheral margin of the fixed window panel, the frame comprising:
  - a web parallel to an outer edge of the sliding window panel and located to confine said edge within the frame;
  - an inner marginal flange extending from one end of the web to lie parallel to a margin of the sliding window panel and located to confine said margin of the sliding window panel within the frame;
  - an outer marginal flange extending from the other end of the web coextensive and flush with said peripheral margin of the fixed window panel to be attachable to said fabric between said fabric and said margin of the fixed window panel.

\* \* \* \* \*